(12) United States Patent
Hasunuma et al.

(10) Patent No.: US 12,438,332 B2
(45) Date of Patent: Oct. 7, 2025

(54) LASER DEVICE

(71) Applicant: Fujikura Ltd., Tokyo (JP)

(72) Inventors: Takashi Hasunuma, Sakura (JP); Shinichi Sakamoto, Sakura (JP); Yasuto Chiba, Sakura (JP); Wataru Kiyoyama, Sakura (JP); Yutaka Yamaguchi, Sakura (JP)

(73) Assignee: Fujikura Ltd., Tokyo (JP)

( * ) Notice: Subject to any disclaimer, the term of this patent is extended or adjusted under 35 U.S.C. 154(b) by 789 days.

(21) Appl. No.: 17/424,078

(22) PCT Filed: Feb. 27, 2020

(86) PCT No.: PCT/JP2020/007967
§ 371 (c)(1),
(2) Date: Jul. 19, 2021

(87) PCT Pub. No.: WO2020/175609
PCT Pub. Date: Sep. 3, 2020

(65) Prior Publication Data
US 2022/0123515 A1 Apr. 21, 2022

(30) Foreign Application Priority Data

Feb. 27, 2019 (JP) .................................. 2019-034375

(51) Int. Cl.
*H01S 3/091* (2006.01)
*G01J 1/42* (2006.01)
*H01S 3/094* (2006.01)

(52) U.S. Cl.
CPC .......... *H01S 3/0912* (2013.01); *G01J 1/4257* (2013.01); *H01S 3/094053* (2013.01)

(58) Field of Classification Search
CPC ...... H01S 3/0014; H01S 3/005; H01S 3/0071; G01J 1/4257; G01M 11/31; B23K 26/707
See application file for complete search history.

(56) References Cited

U.S. PATENT DOCUMENTS

| | | | | |
|---|---|---|---|---|
| 4,673,291 | A | * | 6/1987 | Heckmann ........... G01M 11/335 356/73.1 |
| 4,812,641 | A | * | 3/1989 | Ortiz, Jr. ................. G01M 11/35 356/73.1 |

(Continued)

FOREIGN PATENT DOCUMENTS

| | | | | |
|---|---|---|---|---|
| DE | 202017103758 U1 | * | 10/2018 | ........... G02B 6/4296 |
| JP | 58-57767 A | | 4/1983 | |

(Continued)

OTHER PUBLICATIONS

International Search Report issued in corresponding International Patent Application No. PCT/JP2020/007967 dated Jun. 9, 2020 (2 pages).

*Primary Examiner* — Joshua King
(74) *Attorney, Agent, or Firm* — Osha Bergman Watanabe & Burton LLP

(57) ABSTRACT

A laser device includes at least one light source; a delivery fiber configured to propagate laser light launched from the light source; a monitor fiber optically coupled to the delivery fiber and configured to propagate a part of the light propagating in a direction opposite to a propagation direction of the laser light in the delivery fiber, and a light receiving unit configured to receive the light propagated by the monitor fiber. The light receiving unit is configured to detect first light included in a wavelength band of visible light.

18 Claims, 6 Drawing Sheets

(56) References Cited

U.S. PATENT DOCUMENTS

| | | | | |
|---|---|---|---|---|
| 5,012,087 | A | * | 4/1991 | Rockstroh ............ B23K 26/702 356/73.1 |
| 5,798,518 | A | * | 8/1998 | Coleman ................ A61B 18/20 606/2 |
| 6,490,389 | B1 | * | 12/2002 | Goodwin ........... H04B 10/0791 385/27 |
| 6,528,761 | B1 | * | 3/2003 | Roos ...................... B23K 26/04 219/121.73 |
| 6,932,809 | B2 | * | 8/2005 | Sinofsky ................... G01J 1/42 250/336.1 |
| 8,755,649 | B2 | * | 6/2014 | Yilmaz ................ G02B 6/4291 359/341.1 |
| 8,811,434 | B2 | * | 8/2014 | Miyato ............... H01S 3/10015 372/38.1 |
| 9,134,171 | B2 | * | 9/2015 | Blomster ................ G01M 11/35 |
| 9,261,261 | B2 | * | 2/2016 | Nishio .................... G01J 5/025 |
| 10,478,923 | B2 | * | 11/2019 | Funaki ................ B23K 26/064 |
| 10,630,043 | B1 | * | 4/2020 | Vorontsov ........... H01S 3/10061 |
| 2001/0050768 | A1 | * | 12/2001 | Uchiyama .......... G01M 11/3181 356/73.1 |
| 2005/0111782 | A1 | * | 5/2005 | Donval ................... G02F 1/3525 385/16 |
| 2006/0018586 | A1 | * | 1/2006 | Kishida .............. G01D 5/35383 374/E11.015 |
| 2009/0272885 | A1 | | 11/2009 | Thor et al. |
| 2011/0091155 | A1 | * | 4/2011 | Yilmaz ................ H01S 3/2308 385/27 |
| 2011/0220776 | A1 | * | 9/2011 | Abedin ............ H04B 10/07957 356/73.1 |
| 2013/0299474 | A1 | * | 11/2013 | Kashiwagi ........... B23K 26/042 219/121.81 |
| 2014/0036938 | A1 | * | 2/2014 | Nakai ................. H01S 3/10015 372/6 |
| 2015/0214692 | A1 | | 7/2015 | Miyato et al. |
| 2016/0254637 | A1 | | 9/2016 | Ikoma et al. |
| 2016/0359288 | A1 | * | 12/2016 | Matsuoka ........... G02B 6/4286 |
| 2018/0059323 | A1 | * | 3/2018 | Rivera ................ G02B 6/2821 |
| 2018/0059425 | A1 | * | 3/2018 | Rivera ................... G02B 27/10 |

FOREIGN PATENT DOCUMENTS

| | | | | | |
|---|---|---|---|---|---|
| JP | 2000221108 | A | * | 8/2000 | |
| JP | 2007-514117 | A | | 5/2007 | |
| JP | 2011090050 | A | * | 5/2011 | |
| JP | 2011-252793 | A | | 12/2011 | |
| JP | 2012127903 | A | * | 7/2012 | |
| JP | 2014033098 | A | * | 2/2014 | ......... H01S 3/06754 |
| JP | 5618236 | B2 | * | 11/2014 | |
| JP | 2016189361 | A | * | 11/2016 | ......... G02B 6/02304 |
| JP | 2018129452 | A | | 8/2018 | |
| JP | 2020022988 | A | * | 2/2020 | ........... B23K 26/707 |
| JP | 6802234 | B2 | * | 12/2020 | ......... B23K 26/0604 |
| WO | 2012/073952 | A1 | | 6/2012 | |
| WO | WO-2012165389 | A1 | * | 12/2012 | ............. B23K 26/06 |
| WO | 2014/014068 | A1 | | 1/2014 | |
| WO | WO-2018039501 | A2 | * | 3/2018 | ......... B23K 26/0604 |

* cited by examiner

LASER DEVICE

CROSS-REFERENCE TO RELATED APPLICATIONS

Priority is claimed from Japanese Patent Application No. 2019-034375, filed Feb. 27, 2019, the content of which is incorporated herein by reference.

TECHNICAL FIELD

The present invention relates to a laser device.

BACKGROUND

In laser devices, a phenomenon referred to as "fiber fuse" is known in which once a fiber burns out, the core of the optical fiber is damaged toward a light source. When the fiber fuse has occurred, components present from a point where the fuse has occurred to a light source are damaged.

In recent years, the propagation speed of the fiber fuse has increased along with an increase in the output of a laser, and an area to be damaged in each device tends to expand when the fiber fuse has occurred. Patent Document 1 describes a technique of monitoring visible light emitted from a core heated to a high temperature when fiber fuse has occurred with a light receiver disposed on a side surface of an optical fiber and stopping a device using a signal detected from the monitor.

PATENT LITERATURE

Patent Document 1

Japanese Unexamined Patent Application, First Publication No. 2012-127903

In such a related-art fiber fuse monitor, the occurrence of the fiber fuse can be detected only after the fiber fuse passes through a spot where the light receiver is disposed.

For that reason, at least fiber cores and optical components that lead to the light receiver are damaged at the stage when the occurrence of the fiber fuse has been detected. Additionally, it is difficult to predict where the fiber fuse will operate in an optical circuit up to a light source. Although it is conceivable to dispose a plurality of light receivers over the entire length of the optical circuit, space is required correspondingly. Furthermore, the size of the device is increased, the circuit is complicated, and the cost is increased.

SUMMARY

One or more embodiments of the invention provide a laser device capable of detecting fiber fuse at an early stage.

A laser device according to one or more embodiments of the invention includes at least one light source; a delivery fiber configured to propagate laser light emitted from the light source; a monitor fiber optically coupled to the delivery fiber and configured to propagate a part of light propagating in a direction opposite to a propagation direction of the laser light in the delivery fiber, and a light receiving unit (or "light receiver") configured to receive the light propagated by the monitor fiber. The light receiving unit is configured to detect first light included in a wavelength band of visible light.

In a case where the fiber fuse has occurred in the delivery fiber, the visible light is generated in a core of the delivery fiber. According to one or more embodiments, a part of the visible light propagating inside the core of the delivery fiber toward a light source is coupled to the monitor fiber and propagated to the light receiving unit.

In this way, since the visible light is propagated to the light receiving unit before the fiber fuse reaches the light receiving unit, the fiber fuse can be detected at an early stage.

Additionally, since the generated visible light propagates to the light receiving unit while being confined inside the core of the delivery fiber and the core of the monitor fiber, a large amount of light received by the light receiving unit can be secured. Accordingly, the fiber fuse can be accurately detected.

Additionally, the light receiving unit is configured to preferentially detect the first light included in the wavelength band of the visible light over the second light included the wavelength band of the near-infrared light. Accordingly, in a case where the wavelength of signal light output from the laser device is included in the wavelength band of the near-infrared light (for example, 1070 nm), even in a case where the return light of the signal light is propagated to the light receiving unit, visible light is preferentially detected over the return light of the signal light in the light receiving unit. Therefore, the erroneous detection of the fiber fuse can be suppressed and the fiber fuse can be accurately detected.

Additionally, the light receiving unit may include: a mirror in which a reflectance of the first light is lower than a reflectance of second light included in a wavelength band of near-infrared light and the transmittance of the first light is higher than the transmittance of the second light; and a photoelectric conversion unit (or "photoelectric converter") on which light transmitted through the mirror is incident.

According to one or more embodiments, the near-infrared light (second light) and the visible light (first light) can be separated from the light propagated to the light receiving unit, and then the separated visible light can be propagated to the photoelectric conversion unit. Accordingly, erroneous detection of the fiber fuse can be suppressed, and the fiber fuse can be accurately detected.

Additionally, the light receiving unit may include: a mirror in which a reflectance of the first light is higher than a reflectance of second light included in a wavelength band of near-infrared light; and a photoelectric conversion unit on which light reflected by the mirror is incident.

According to one or more embodiments, the near-infrared light (second light) incident on the photoelectric conversion unit is reduced. Therefore, the ratio of the visible light (first light) to the light incident on the photoelectric conversion unit can be increased. Accordingly, erroneous detection of the fiber fuse can be suppressed, and the fiber fuse can be accurately detected.

Additionally, in the mirror, the transmittance of the second light may be higher than the transmittance of the first light, and when the light receiving unit is viewed in a plan view, an inner wall surface of the light receiving unit that light transmitted through the mirror reaches may be inclined with respect to a direction in which the light transmitted through the mirror. An inclination angle of the inner wall surface of the light receiving unit may be larger than 0° and less than 90° with respect to a direction in which the light transmitted through the mirror propagates.

According to one or more embodiments, it is possible to suppress a phenomenon in which the near-infrared light (second light) transmitted through the mirror is reflected by the inner wall surface of the light receiving unit and returned to the monitor fiber. Accordingly, the generation of heat in the vicinity of the monitor fiber can be suppressed.

Additionally, in the mirror, the transmittance of the second light may be higher than the transmittance of the first light, and when the light receiving unit is viewed in a plan view, an inner wall surface of the light receiving unit that light transmitted through the mirror reaches may be a curved surface.

According to one or more embodiments, it is possible to suppress a phenomenon in which the near-infrared light (second light) transmitted through the mirror is reflected by the inner wall surface of the light receiving unit and returned to the monitor fiber. Accordingly, the generation of heat in the vicinity of the monitor fiber can be suppressed.

Additionally, when the light receiving unit is viewed in a plan view, an incident surface of the mirror may be inclined by 45° with respect to a propagation direction of light propagated from the monitor fiber.

According to one or more embodiments, when the light receiving unit is viewed in a plan view, the position of the photoelectric conversion unit can be disposed in a propagation direction of the light incident from the monitor fiber to the light receiving unit or in a direction perpendicular to the light propagation direction of the light incident on the light receiving unit from the monitor fiber.

Additionally, in the photoelectric conversion unit, a photoelectric conversion efficiency of the wavelength band of the visible light may be higher than a photoelectric conversion efficiency of the wavelength band of the near-infrared light.

According to one or more embodiments, the visible light can be preferentially converted into a photoelectric current over the near-infrared light, and the fiber fuse can be accurately detected.

The second light belonging to the wavelength band of the near-infrared light may be laser light emitted from the light source.

According to one or more embodiments, even in a case where the return light of the laser light emitted from the light source is propagated to the light receiving unit, the light receiving unit can preferentially detect the visible light over the return light of the laser light by virtue of the above-described configuration. Therefore, erroneous detection of the fiber fuse can be suppressed, and the fiber fuse can be accurately detected.

The laser device may further include a plurality of input fibers optically coupled to a plurality of light sources that include the light source; and a bridge fiber having an incident end face and an propagating end face and in which the plurality of input fibers are connected to the incident end face, a first end face of the monitor fiber may be connected to the incident end face of the bridge fiber, and a first end face of the delivery fiber may be connected to the propagating end face of the bridge fiber.

According to one or more embodiments, an empty port of the bridge fiber where the lights from the plurality of light sources are combined together can be used as the monitor fiber. Therefore, it is not necessary to use an optical coupler for the delivery fiber to branch the light for the monitor, and the configuration can be simplified. Additionally, since insertion loss of the laser light due to the optical coupler does not occur, it is possible to suppress a decrease in the output of the laser light. Additionally, since heat is not generated due to the insertion loss of the optical coupler, the safety of the laser device can be enhanced.

Additionally, when the incident end face of the bridge fiber is viewed in a plan view, the first end face of the monitor fiber may be included in the first end face of the delivery fiber.

According to one or more embodiments, the visible light propagating from the delivery fiber to the light source (in the direction opposite to the propagation direction of the laser light) is likely to be coupled to the monitor fiber. For this reason, the fiber fuse can be stably detected.

Additionally, a filter that is disposed between the mirror and the photoelectric conversion unit and in which the transmittance of the first light included the wavelength band of the visible light is higher than the transmittance of the second light may be further provided.

According to one or more embodiments, since the laser light incident on the photoelectric conversion unit is reduced, it is possible to suppress erroneous detection of the fiber fuse to accurately detect the fiber fuse.

Additionally, when the light receiving unit is viewed in a plan view, an inclination angle of an incident surface of the filter with respect to a propagation direction of light incident on the photoelectric conversion unit may be larger than 0° and less than 90°.

According to one or more embodiments, the return of the light reflected by the filter to the monitor fiber can be suppressed as compared to a case where the inclination angle of the incident surface of the filter with respect to the propagation direction of the light incident on the photoelectric conversion unit is 90°. Accordingly, the generation of heat in the vicinity of the end face of the monitor fiber can be suppressed.

The photoelectric conversion unit may include a transimpedance circuit that is configured to convert a current signal generated by the photodiode into a voltage signal, and the transimpedance circuit may include a low-pass filter that is configured to remove an AC component of the voltage signal.

In a case where machining is performed using the laser device, a plasma may be randomly generated depending on a machined state. According to one or more embodiments, a noise signal generated by the plasma light can be removed, and the fiber fuse can be accurately detected.

Additionally, the photoelectric conversion unit may include a photodiode, and in the photodiode, a photoelectric conversion efficiency of the first light may be higher than a photoelectric conversion efficiency of the second light.

According to one or more embodiments, the visible light (first light) can be preferentially converted into a photoelectric current over the near-infrared light (second light), and the fiber fuse can be accurately detected.

Additionally, the photoelectric conversion unit may include a transimpedance circuit that is configured to convert a current signal generated by the photodiode into a voltage signal, and the transimpedance circuit may include a low-pass filter that is configured to remove an AC component of the voltage signal.

In a case where machining is performed using the laser device, a plasma may be randomly generated depending on a machined state. According to one or more embodiments, a noise signal generated by the plasma light can be removed, and the fiber fuse can be accurately detected.

Additionally, an inner wall surface of the light receiving unit may be subjected to damper treatment.

According to one or more embodiments, the return of the light reflected by the inner wall surface of the light receiving unit toward the monitor fiber can be suppressed. Accordingly, the generation of heat in the vicinity of the end face of the monitor fiber can be suppressed.

Additionally, the laser device may further include a determination unit (or "determinator") configured to determine whether or not fiber fuse has occurred on the basis of a signal from the light receiving unit; and a control unit configured to control a power of the laser light output from the light source on the basis of the determination of the determination unit.

According to one or more embodiments, the output from the light source can be controlled when the fiber fuse has occurred. Accordingly, the safety of the laser device can be enhanced.

The power of the laser light may be 1 kW or more, and a time from when the determination unit determines that the fiber fuse has occurred until the control unit stops the power of the laser light may be 100 msec or less.

As the output of the laser increases, the propagation speed of the fiber fuse also increases. In particular, when the power is 1 kW or more, the fuse propagates at a speed of 10 m/s. According to one or more embodiments, the area damaged in the device when the fiber fuse has occurred can be reduced.

Advantageous Effects of Invention

According to the laser device, it is possible to detect the fiber fuse at an early stage.

DETAILED DESCRIPTION

Hereinafter, one or more embodiments of a laser device according to the invention will be described in detail with reference to the drawings.

The configuration of the laser device of one or more embodiments will be described.

Figure 1:
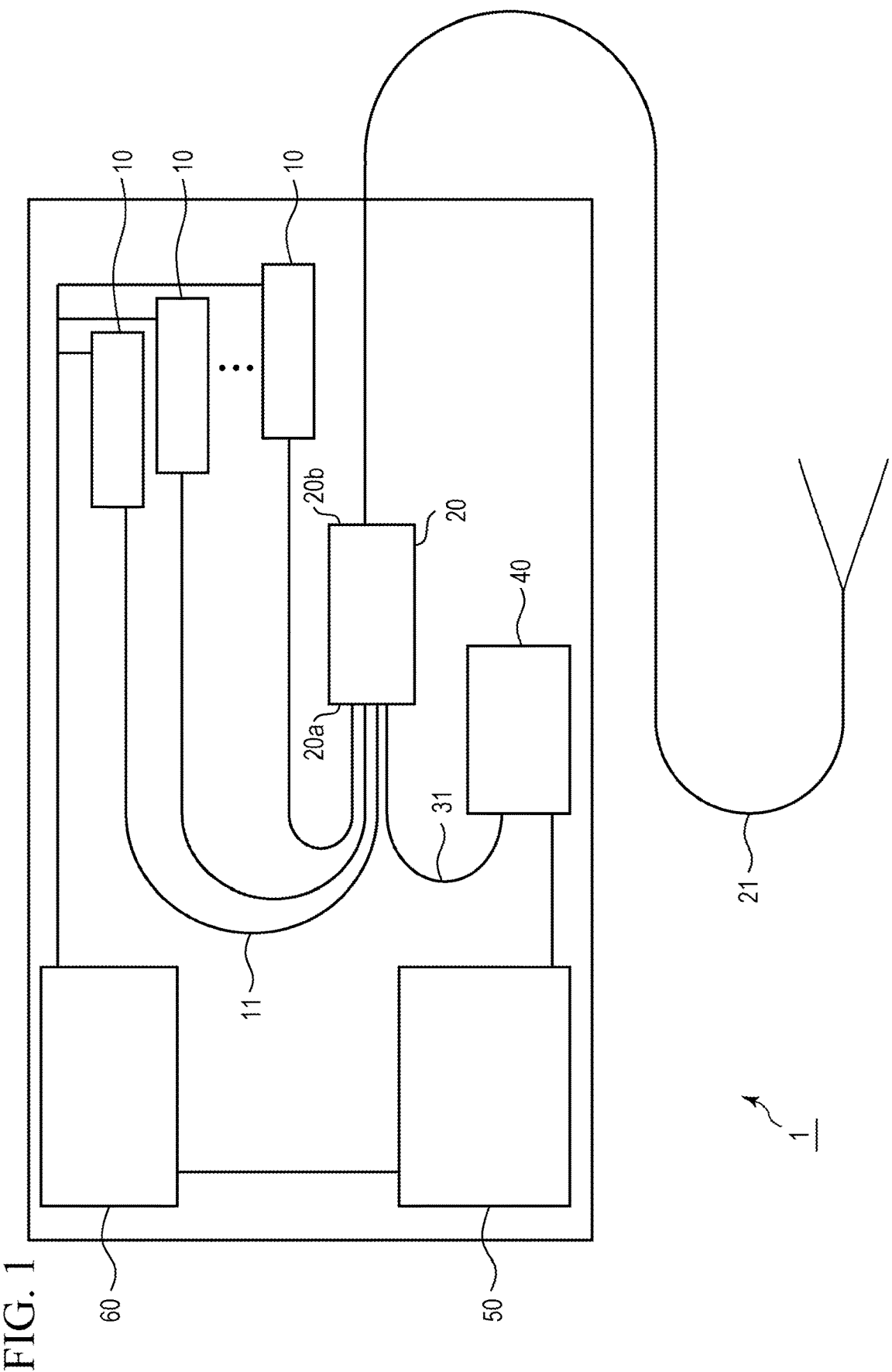
FIG. 1 is a conceptual diagram showing a laser device according to one or more embodiments of the invention.

FIG. 1 is a conceptual diagram showing a laser device according to one or more embodiments of the invention. As shown in FIG. 1, a laser device 1 of the present embodiment includes a plurality of light sources 10, a bridge fiber 20, a delivery fiber 21, a monitor fiber 31, and a light receiving unit 40 as a main configuration. In the present embodiment, a multimode fiber is used as the delivery fiber 21.

Each light source 10 is a laser light source that emits signal light having a predetermined wavelength, and is, for example, a fiber laser device or a solid-state laser device. In a case where the light source 10 is the fiber laser device, a resonator type fiber laser device or a master oscillator power amplifier (MO-PA) type fiber laser device can be used. The signal light emitted from each of the light sources 10 is second light having a wavelength included in the near-infrared light, and in the present embodiment, is light having a wavelength of 1070 nm.

An input fiber (input fiber bundle) 11 configured to propagate laser light emitted from the light source 10 is connected to each light source 10. Each input fiber 11 is, for example, a few-mode fiber having a core diameter of about 20 μm. Therefore, the laser light emitted from each light source 10 propagates through each input fiber 11 in an LP mode of about 2 to 10.

The bridge fiber 20 is a member that connects cores of the plurality of input fibers 11 and a core of the delivery fiber 21. The bridge fiber 20 has an incident end face 20a to which the plurality of input fibers 11 are connected and a propagating end face 20b to which the delivery fiber 21 is connected.

The laser lights propagating through the plurality of input fibers 11 are combined together by the bridge fiber 20 to generate output light. The generated output light propagates through the delivery fiber 21 and is output to the outside of the laser device 1. The power of the output light is, for example, 1 kW or more.

Here, in a case where a "fiber fuse" phenomenon operates in the delivery fiber 21, visible light is emitted from the core heated to a high temperature when the fiber fuse has occurred. A part of the visible light propagates toward the light source 10 (in a direction opposite to a propagation direction of the output light) inside the core of the delivery fiber 21. The visible light propagating through the delivery fiber 21 is incident on the propagating end face 20b of the bridge fiber 20 and is further propagated from the incident end face 20a of the bridge fiber 20.

In this case, a part of the visible light is coupled to a core of a monitor fiber 31 connected to the incident end face 20a of the bridge fiber 20, and a part of the visible light propagating through the monitor fiber 31 is propagated to the light receiving unit 40. In this way, since the core of the delivery fiber 21 in which the fiber fuse has occurred and the light receiving unit 40 are optically coupled to each other, the visible light generated when the fiber fuse has occurred can be propagated to the light receiving unit 40. Since the visible light is propagated to the light receiving unit 40 before the fiber fuse reaches the light receiving unit 40, the fiber fuse can be detected at an early stage.

Additionally, since the generated visible light propagates to the light receiving unit 40 while being confined inside the core of the delivery fiber 21 and the core of the monitor fiber 31, a large amount of light received by the light receiving unit 40 can be secured. Accordingly, the fiber fuse can be accurately detected.

Additionally, when the incident end face 20a of the bridge fiber 20 is viewed in a plan view from a direction along an optical axis, a first end face of the monitor fiber 31 connected to the incident end face 20a of the bridge fiber 20 may be contained on a first end face of the delivery fiber 21 connected to the propagating end face 20b of the bridge fiber 20.

According to one or more embodiments, the visible light propagating from the delivery fiber 21 to the light source 10 (in the direction opposite to the propagation direction of the laser light) is likely to be coupled to the monitor fiber 31. For this reason, the fiber fuse can be stably detected.

The visible light is photoelectrically converted in the light receiving unit 40. The photoelectrically converted visible light is input to a determination unit 50 as a monitor signal. Next, the determination unit 50 compares a predetermined threshold value with the value of the monitor signal. In a case where the value of the monitor signal exceeds the predetermined threshold value, the determination unit 50 determines that the fiber fuse has occurred. On the basis of the determination result, the control unit 60 controls the electric current of the light source 10 to cut off or reduce the output power of the light source 10.

According to the present embodiment, since the fiber fuse can be detected at an early stage, the control is performed, so that an area damaged in the laser device 1 when the fiber fuse has occurred can be reduced, and the cost associated with a repair such as component replacement can be reduced.

Additionally, the time from when the determination unit 50 determines that the fiber fuse has occurred until the control unit 60 stops the power of the laser light may be 100 msec or less. As the output of the laser increases, the propagation speed of the fiber fuse also increases. In particular, when the speed is 1 kW or more, the fiber fuse proceeds at a speed of 10 m/s. By virtue of this configuration, the area damaged in the device when the fiber fuse has occurred can be further reduced.

Meanwhile, there is a case where the output light output from the laser device 1 to the outside is reflected by an object to be irradiated with the laser light and returned to the laser device 1 as return light (hereinafter, referred to as return light). The return light is incident from the delivery fiber 21 and propagates toward the light source (in the direction opposite to the propagation direction of the output light). Similar to the above-described visible light, the return light also propagates to the light receiving unit 40. Therefore, there is a possibility that the occurrence of the fiber fuse is erroneously detected.

Here, the light receiving unit 40 detects light including first light in the wavelength band (400 nm to 700 nm) of the visible light. Specifically, the light receiving unit 40 preferentially detects the first light, which is the wavelength band of the visible light, over the second light, which is the wavelength band of the near-infrared light (800 to 2500 nm). For this reason, even in a case where the return light of the output light belonging to the wavelength band of the near-infrared light is propagated to the light receiving unit 40, the light receiving unit 40 preferentially detects more visible light than the return light. Therefore, the erroneous detection of the fiber fuse can be suppressed and the fiber fuse can be accurately detected.

(Light Receiving Unit)

Figure 2:
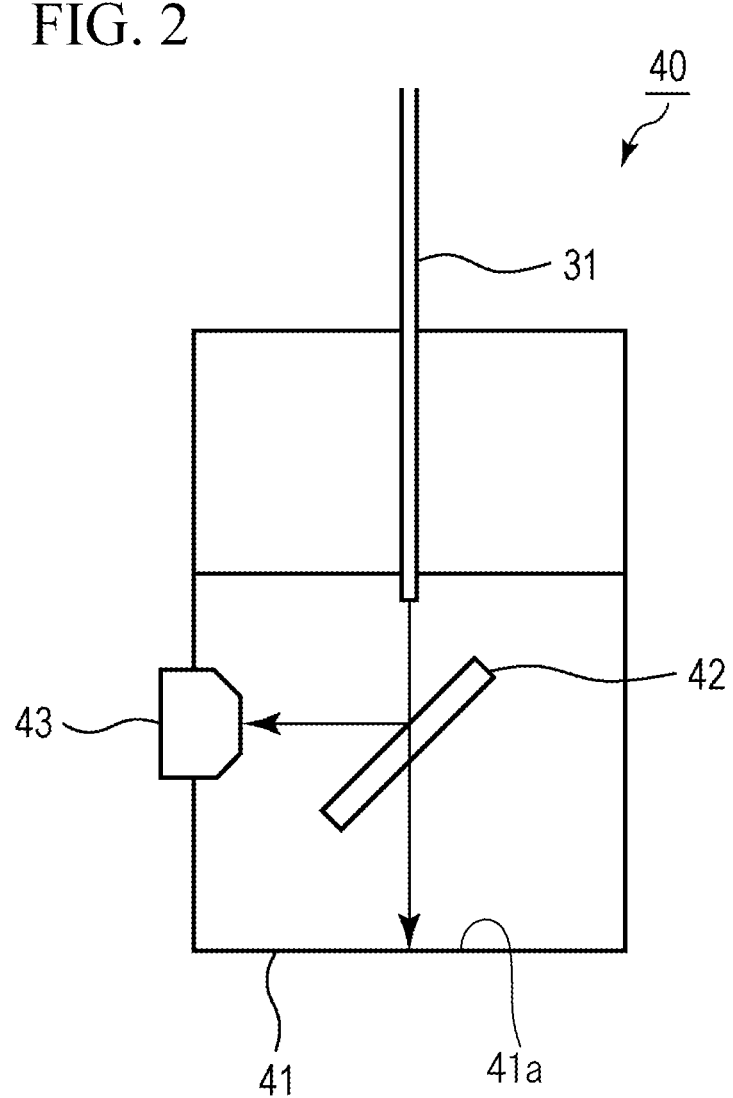
FIG. 2 is a conceptual diagram showing a light receiving unit according to one or more embodiments of the invention.

The light receiving unit 40 according to one or more embodiments will be described with reference to FIGS. 2 to 6. In addition, in FIGS. 2 to 6, the same or corresponding components will be designated by the same reference numerals, and duplicated description will be omitted. As shown in FIG. 2, the light receiving unit 40 includes a light receiving unit body 41, a photoelectric conversion unit 43, a visible light reflection type mirror 42, and a part of the monitor fiber 31 as a main configuration. Additionally, the photoelectric conversion unit 43, the visible light reflection type mirror 42, and a part of the monitor fiber 31 are disposed inside the light receiving unit body 41.

As shown in FIG. 2, the light propagating through the monitor fiber 31 and incident on the light receiving unit 40 is incident on the visible light reflection type mirror 42. Additionally, an incident surface of the visible light reflection type mirror 42 is inclined by 45° with respect to the propagation direction of the light propagated from one end portion of the monitor fiber 31 when the light receiving unit 40 is viewed in a plan view. Additionally, the photoelectric conversion unit 43 is disposed in a direction perpendicular to the propagation direction of the light incident on the light receiving unit from the monitor fiber 31 and in a direction in which the light reflected by the visible light reflection type mirror 42 propagates.

In the visible light reflection type mirror 42, the reflectance of the light belonging to the wavelength band of the visible light (first light) is higher than the reflectance of the light belonging to the wavelength band of the near-infrared light (second light). For that reason, the laser light belonging to the wavelength band of the visible light in the light incident on the visible light reflection type mirror 42 is reflected by the visible light reflection type mirror 42 and incident on the photoelectric conversion unit 43. According to one or more embodiments, the visible light in the light propagating through the monitor fiber 31 can be preferentially incident on the photoelectric conversion unit 43 over the near-infrared light.

The light belonging to the wavelength band of the near-infrared light may be the laser light output from the light source 10. The incidence of the above-described return light onto the photoelectric conversion unit 43 can be suppressed, and the fiber fuse can be accurately detected.

The photoelectric conversion unit 43 converts the incident light (mainly visible light) into the monitor signal. The photoelectric conversion unit 43 includes a photodiode and a transimpedance circuit that converts a photoelectric current generated by the photodiode into a voltage (monitor signal). Here, in the photodiode, the photoelectric conversion efficiency of the light included in the wavelength band of the visible light is higher than the photoelectric conversion efficiency of the light included in the wavelength band of the near-infrared light. For this reason, the visible light can be preferentially converted into the monitor signal over the near-infrared light. Accordingly, it is possible to accurately detect the fiber fuse.

As the above photodiode, GaP may be used to form the photodiode. This is because the photoelectric conversion efficiency of the light included in the wavelength band of the near-infrared light can be reduced (nearly zero).

The light belonging to the wavelength band of the near-infrared light may be the laser light output from the light source 10. Accordingly, the visible light in the light incident on the photodiode can be preferentially converted into the monitor signal over the laser light, and the fiber fuse can be accurately detected.

Additionally, the transimpedance circuit of the photoelectric conversion unit 43 includes a low-pass filter that is configured to remove an AC component of the monitor signal. Specifically, a capacitor is inserted in parallel with a transimpedance resistor. In a case where machining is performed using the laser device, a plasma may be randomly generated in the vicinity of a workpiece depending on a machined state. According to one or more embodiments, noise caused by plasma light generated by the machining can be removed from the monitor signal, and the fiber fuse can be accurately detected.

Additionally, in the visible light reflection type mirror 42, the transmittance of the light (second light) belonging to the wavelength band of the near-infrared light is higher than the transmittance of the light (first light) belonging to the wavelength band of the visible light. More specifically, the transmittance of the laser light output from the light source 10 is higher than the transmittance of the light belonging to the wavelength band of the visible light. For that reason, the component of the return light (the component of the laser light output from the light source 10) in the light incident on the visible light reflection type mirror 42 is transmitted through the visible light reflection type mirror 42 and is incident on an inner wall surface 41*a* of the light receiving unit body 41.

Here, the inner wall surface 41*a* of the light receiving unit body 41 on which the light transmitted through the visible light reflection type mirror 42 is incident is subjected to black hard anodized finish. Accordingly, the light incident on the inner wall surface 41*a* is absorbed by the inner wall surface and converted into heat. Additionally, the inner wall surface 41*a* of the light receiving unit body 41 on which the light transmitted through the visible light reflection type mirror 42 is incident is subjected to a matte (satin) treatment in which the surface is chemically roughened.

Accordingly, the incident light can be scattered. In this way, damper treatment is performed such that the light incident on the inner wall surface 41*a* of the light receiving unit body 41 is not returned to the monitor fiber 31, so that the heat generated in the vicinity of the monitor fiber 31 caused by the absorption of light into a coating of the monitor fiber 31 or the like can be suppressed.

Figure 3:
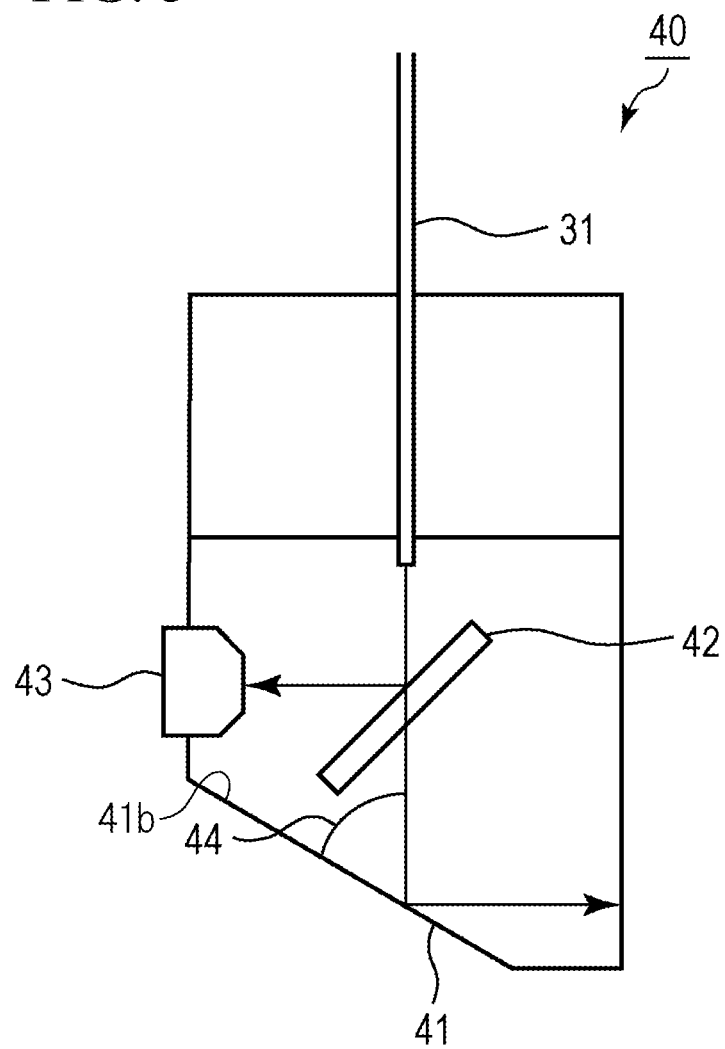
FIG. 3 is a conceptual diagram showing a modification example in which a part of the light receiving unit shown in FIG. 2 is modified.

Moreover, the light receiving unit 40 may have a structure that does not return the light incident on the inner wall surface of the light receiving unit body 41 to the monitor fiber 31. For example, as shown in FIG. 3, the light receiving unit 40 may be formed with an inclined surface (inner wall surface) 41*b*. The inclined surface 41*b* is inclined with respect to the direction in which the light transmitted through the visible light reflection type mirror 42 propagates, when the light receiving unit 40 is viewed in a plan view. The light transmitted through the visible light reflection type mirror 42 reaches the inclined surface 41*b*. The inclination angle 44 of the inclined surface 41*b* may be larger than 0° and less than 90°. According to one or more embodiments, it is possible to further suppress a phenomenon in which the near-infrared light transmitted through the visible light reflection type mirror 42 is reflected by the inner wall surface of the light receiving unit body 41 and returned to the monitor fiber 31. Accordingly, the heat generated in the vicinity of the monitor fiber 31 can be suppressed.

Figure 4:
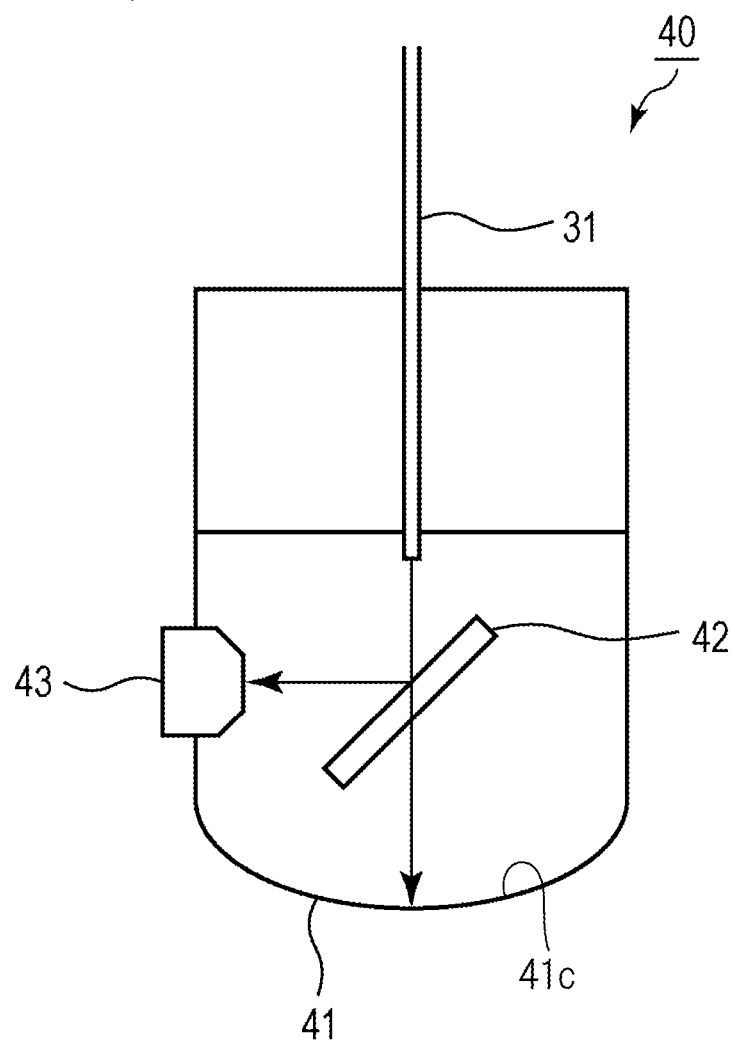
FIG. 4 is a conceptual diagram showing a modification example in which a part of the light receiving unit shown in FIG. 2 is modified.

Moreover, the light receiving unit 40 may have a configuration for preventing the light incident on the inner wall surface of the light receiving unit body 41 from being returned to the monitor fiber 31. For example, as shown in FIG. 4, the light receiving unit 40 may be formed with a curved surface (inner wall surface) 41*c*. The curved surface 41*c* is curved with respect to the direction in which the light transmitted through the visible light reflection type mirror 42 propagates, when the light receiving unit 40 is viewed in a plan view. The light transmitted through the visible light reflection type mirror 42 reaches the curved surface 41*c*. The curved surface 41*c* may be a curved surface that is convex toward the outside of the light receiving unit body 41. According one or more embodiments, it is possible to suppress the phenomenon in which the near-infrared light transmitted through the visible light reflection type mirror 42 is reflected by the inner wall surface of the light receiving unit body 41 and returned to the monitor fiber 31. Accordingly, the generation of heat in the vicinity of the monitor fiber 31 can be suppressed.

Figure 5:
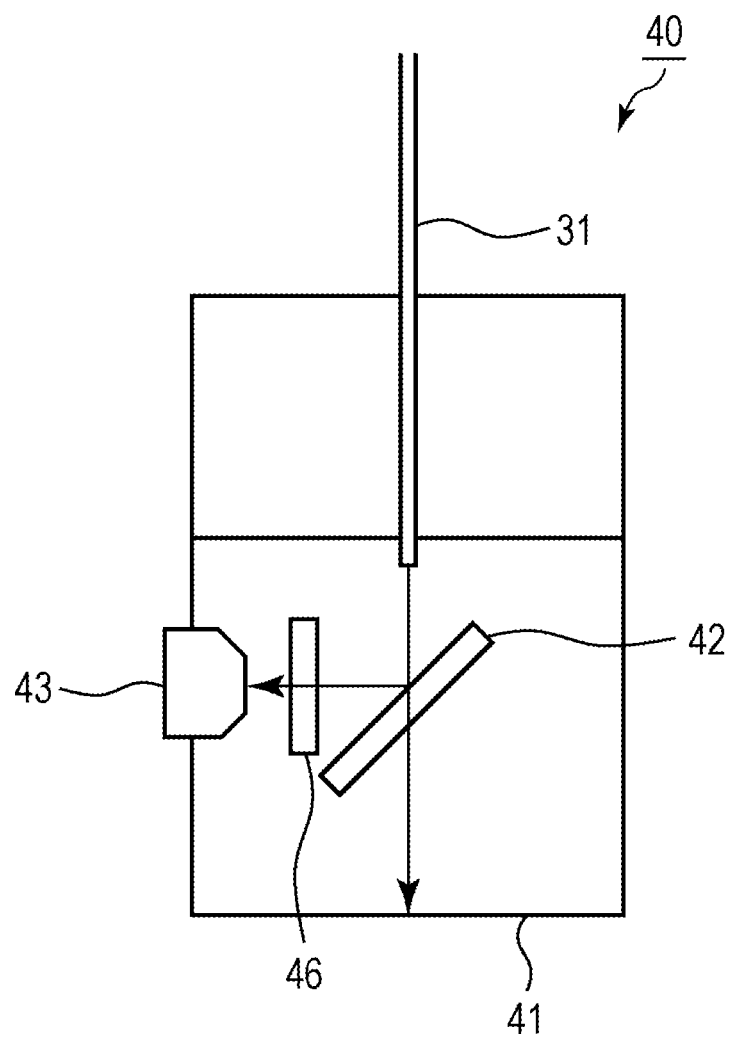
FIG. 5 is a conceptual diagram showing a modification example in which a part of the light receiving unit shown in FIG. 2 is modified.

Additionally, as shown in FIG. 5, as a structure for causing the visible light in the light propagating through the monitor fiber 31 to be preferentially incident on the photoelectric conversion unit 43 over the near-infrared light, a filter 46 may be disposed between the visible light reflection type mirror 42 and the photoelectric conversion unit 43. The filter 46 preferentially transmits the first light which is the wavelength band of the visible light, over the laser light (in other words, the transmittance of the first light is higher than the transmittance of the second light).

In the present embodiment, although the delivery fiber 21 has been described using the multimode fiber, the type of fiber is not particularly limited.

The filter 46 may be constituted of, for example, a dielectric multilayer film.

(Modification Example of Light Receiving Unit)

Figure 6:
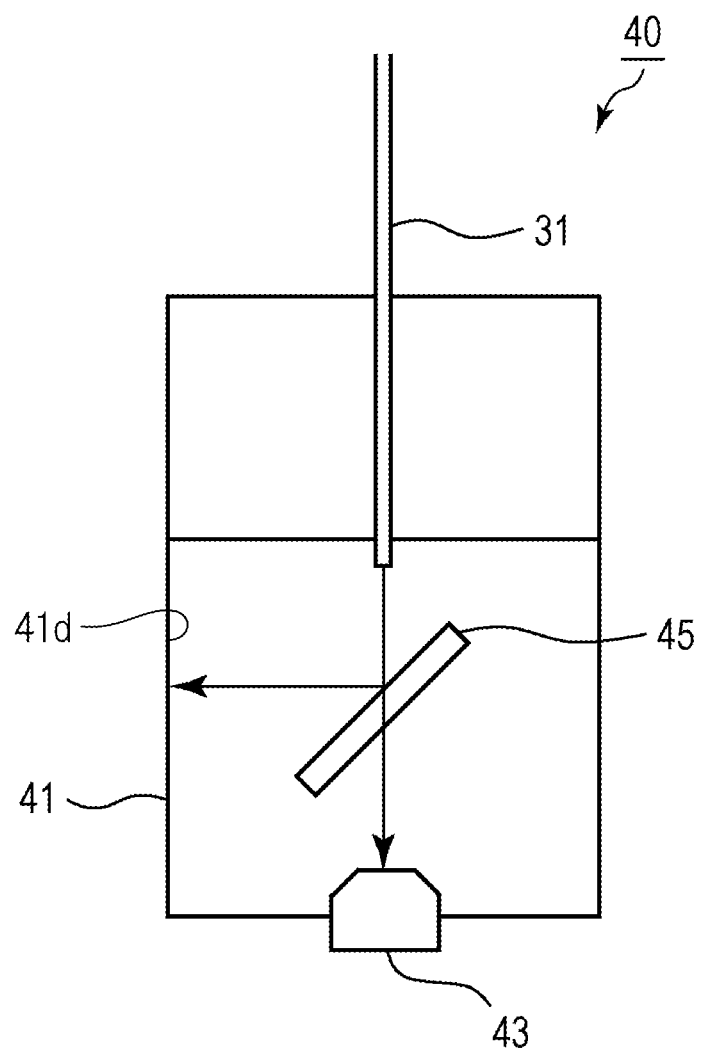
FIG. 6 is a conceptual diagram showing a modification example of the light receiving unit shown in FIG. 2.

FIG. 6 shows a modification example of the light receiving unit 40. As shown in FIG. 6, the light propagating through the monitor fiber 31 is incident on a near-infrared light reflection type mirror 45. Additionally, an incident surface of the near-infrared light reflection type mirror 45 is inclined by 45° with respect to the propagation direction of the light propagated from the monitor fiber 31, when the light receiving unit 40 is viewed in a plan view. Additionally, the photoelectric conversion unit 43 is disposed in the propagation direction in which the light incident on the light receiving unit 40 from the monitor fiber 31 propagates and the light transmitted through the near-infrared light reflection type mirror 45 propagates. In addition, a filter for transmitting the light included in the wavelength band of the visible light may be further provided between the near-infrared light reflection type mirror 45 and the photoelectric conversion unit 43.

In the near-infrared light reflection type mirror 45, the reflectance of the light belonging to the wavelength band of the near-infrared light (first light) is higher than the reflectance of the light belonging to the wavelength band of the visible light (second light). For that reason, the light mainly belonging to the wavelength band of the near-infrared light (mainly the return light component of the laser light output from the light source) in the light incident on the near-infrared light reflection type mirror 45 is reflected by the near-infrared light reflection type mirror 45 and is incident on an inner wall surface 41*d* of the light receiving unit body 41. The inner wall surface 41*d* may be subjected to the damper treatment as described above.

Additionally, in the near-infrared light reflection type mirror 45, the transmittance of the light (first light) belonging to the wavelength band of the visible light is higher than the transmittance of the light (second light) belonging to the wavelength band of the near-infrared light. More specifically, the transmittance of the visible light is higher than the transmittance of the laser light output from the light source 10. For that reason, the component of the visible light in the light incident on the near-infrared light reflection type mirror 45 is transmitted through the near-infrared light reflection type mirror 45 and is incident on the photoelectric conversion unit 43.

According to one or more embodiments, the visible light in the light propagating through the monitor fiber 31 can be preferentially incident on the photoelectric conversion unit 43 over the near-infrared light.

The light belonging to the wavelength band of the near-infrared light described in the present modification example may be the laser light output from the light source 10.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Laser device
10: Light source

11: Input fiber
20: Bridge fiber
21: Delivery fiber
31: Monitor fiber
40: Light receiving unit
42: Visible light reflection type mirror
43: Photoelectric conversion unit
45: Near-infrared light reflection type mirror
50: Determination unit
60: Control unit

What is claimed is:

1. A laser device comprising:
a first light source;
a delivery fiber that propagates, in a propagation direction of the delivery fiber, laser light emitted from the first light source;
a monitor fiber that:
is optically coupled to the delivery fiber, and
propagates a first light that does not propagate in the propagation direction in the delivery fiber, wherein the first light is in a wavelength band of visible light emitted by a fiber fuse, and is part of light propagating in a direction opposite to the propagation direction of the laser light in the delivery fiber;
a light receiver that receives the first light propagated by the monitor fiber and detects the first light;
an input fiber bundle comprising input fibers optically coupled to a plurality of light sources including the first light source; and
a bridge fiber comprising an incident end face and a propagating end face, wherein
the light receiver comprises:
a near-infrared light reflection type mirror that has:
a lower reflectance of the first light than a second light in a wavelength band of near-infrared light, and
a higher transmittance of the first light than the second light; and
a photoelectric converter on which light transmitted through the near-infrared light reflection type mirror is incident,
the input fiber bundle is connected to the incident end face in the bridge fiber,
a first end face of the monitor fiber is connected to the incident end face of the bridge fiber, and
a first end face of the delivery fiber is connected to the propagating end face of the bridge fiber.

2. The laser device according to claim 1, wherein the photoelectric converter has a higher photoelectric conversion efficiency of the wavelength band of visible light than near-infrared light.

3. The laser device according to claim 1, further comprising:
a filter that:
is disposed between the near-infrared light reflection type mirror and the photoelectric converter, and
has a higher transmittance of the first light than the second light.

4. The laser device according to claim 1, wherein the photoelectric converter comprises a photodiode that has a higher photoelectric conversion efficiency of the first light than the second light.

5. The laser device according to claim 4, wherein
the photoelectric converter comprises a transimpedance circuit that converts a current signal generated by the photodiode into a voltage signal, and
the transimpedance circuit comprises a low-pass filter that removes an AC component of the voltage signal.

6. The laser device according to claim 1, wherein an inner wall surface of the light receiver is treated with damper treatment.

7. The laser device according to claim 1, wherein, in a plan view of the incident end face of the bridge fiber, the first end face of the monitor fiber is included in the first end face of the delivery fiber.

8. The laser device according to claim 2, further comprising:
a determinator that determines whether the fiber fuse has occurred on the basis of a signal from the light receiver; and
a controller that controls a power of the laser light output from the first light source based on the determination of the determinator.

9. The laser device according to claim 1, wherein when the fiber fuse has occurred in the delivery fiber, the light receiver detects the first light that is emitted by the fiber fuse, that propagates in the direction opposite to the propagation direction, and that is delivered to the light receiver via the delivery fiber and the monitor fiber.

10. A laser device comprising:
a first light source;
a delivery fiber that propagates, in a propagation direction of the delivery fiber, laser light emitted from the first light source;
a monitor fiber that:
is optically coupled to the delivery fiber, and
propagates a first light that does not propagate in the propagation direction in the delivery fiber, wherein the first light is in a wavelength band of visible light emitted by a fiber fuse, and is part of light propagating in a direction opposite to the propagation direction of the laser light in the delivery fiber;
a light receiver that receives the first light propagated by the monitor fiber and detects the first light;
an input fiber bundle comprising input fibers optically coupled to a plurality of light sources including the first light source; and
a bridge fiber comprising an incident end face and a propagating end face, wherein
the light receiver comprises:
a visible light reflection type mirror that has a higher reflectance of the first light than a second light in a wavelength band of near-infrared light; and
a photoelectric converter on which light reflected by the visible light reflection type mirror is incident,
the input fiber bundle is connected to the incident end face in the bridge fiber,
a first end face of the monitor fiber is connected to the incident end face of the bridge fiber, and
a first end face of the delivery fiber is connected to the propagating end face of the bridge fiber.

11. The laser device according to claim 10, further comprising:
a filter that:
is disposed between the visible light reflection type mirror and the photoelectric converter, and
has a higher transmittance of the first light than the second light.

12. The laser device according to claim 10, wherein the photoelectric converter has a higher photoelectric conversion efficiency in the wavelength band of visible light than near-infrared light.

13. The laser device according to claim 10, wherein the photoelectric converter comprises a photodiode that has a higher photoelectric conversion efficiency of the first light than the second light.

14. The laser device according to claim 13, wherein the photoelectric converter comprises a transimpedance circuit that:
   converts a current signal generated by the photodiode into a voltage signal, and
   comprises a low-pass filter that removes an AC component of the voltage signal.

15. The laser device according to claim 10, wherein an inner wall surface of the light receiver is treated with damper treatment.

16. The laser device according to claim 10, wherein when the fiber fuse has occurred in the delivery fiber, the light receiver detects the first light that is emitted by the fiber fuse, that propagates in the direction opposite to the propagation direction, and that is delivered to the light receiver via the delivery fiber and the monitor fiber.

17. The laser device according to claim 10, further comprising:
   a determinator that determines whether the fiber fuse has occurred on the basis of a signal from the light receiver; and
   a controller that controls a power of the laser light output from the first light source based on the determination of the determinator.

18. The laser device according to claim 10, wherein, in a plan view of the incident end face of the bridge fiber, the first end face of the monitor fiber is included in the first end face of the delivery fiber.

\* \* \* \* \*